H. ZEGLIN.
CORNER BEAD FASTENING.
APPLICATION FILED JUNE 9, 1909.

950,886.

Patented Mar. 1, 1910.

Witnesses:
Flora Greenwald
Alfred Lyons

Inventor:
Hermann Zeglin
by L. K. Böhm,
Attorney.

UNITED STATES PATENT OFFICE.

HERMANN ZEGLIN, OF BERLIN, GERMANY.

CORNER-BEAD FASTENING.

950,886.

Specification of Letters Patent. Patented Mar. 1, 1910.

Application filed June 9, 1909. Serial No. 501,162.

*To all whom it may concern:*

Be it known that I, HERMANN ZEGLIN, a subject of the King of Prussia, German Emperor, and resident of 39 Stralauerstrasse, Berlin, Germany, have invented new and Improved Means for a New and Improved Corner-Bead Fastening, of which the following is a specification.

This invention relates to means for fastening metal corner beadings to masonry. Such beadings are employed, for instance, on the edges of steps to protect the said edges from being too rapidly worn away.

The object of the present invention is to provide a convenient and simple method for fixing the dowel pins to the said beadings.

It is old to provide the beadings with a groove and to fix the dowel pins at a suitable point in the groove, where the said pins have to be driven into the wall.

The present invention relates to a simple and improved means for fixing the said dowel pins at any desired point in the length of the groove without the necessity of employing any hammering action.

To this end the improved fastening device consists of a dowel pin having a head set at an angle to the said pin, said head being provided with a slot adapted to receive a key which on rotation widens the slot and thereby causes the head to grip tightly in the groove of the corner beading.

The accompanying drawings illustrate the present invention as applied to a protecting corner piece.

Figure 1:
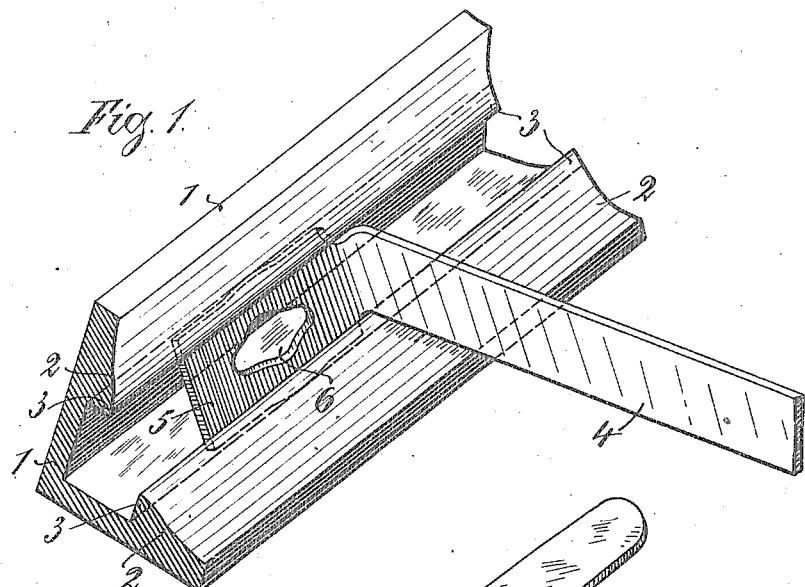
Figure 2:
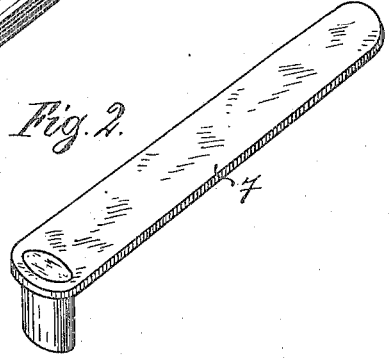
Figure 3:
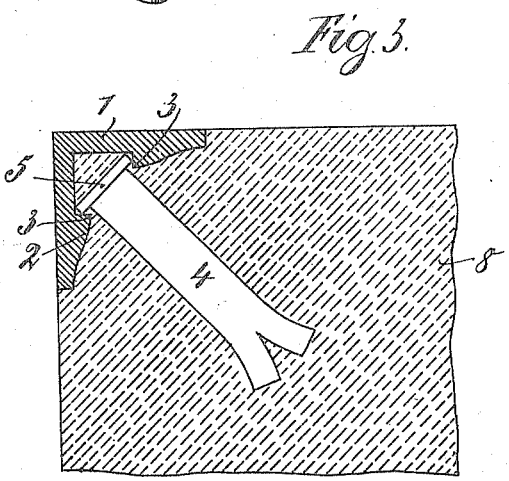

Figure 1 is an illustration of the protecting corner piece and dowel pin showing the method of fastening the dowel pin in the groove of the corner piece. Fig. 2 is a detached view of the tool which I may employ for widening the head of the dowel pin in the groove. Fig. 3 shows the protecting corner piece in position on a piece of masonry.

In carrying the invention into effect according to the form shown the angle piece 1 is provided on the sides of the angles with projections 2 which form shoulders 3. The shoulders 3, as can be seen in Fig. 1, form an undercut groove on the inner sides of the angle. Into this groove there passes the head 5 of a dowel pin 4. The head 5 is conveniently bent substantially at right angles to the point 4 and is provided with a slot 6. When the dowel pin has been moved along the undercut groove in the angle piece 1 till it is at the point desired the key 7 is inserted in the slot 6 and by rotating the said key the slot 6 is widened so that the head 5 is jammed in the groove behind the shoulders 3. The angle piece so arranged is then fixed to the masonry 8 in the usual manner.

I claim:—

1. The combination with a metal corner beading having a longitudinal groove therein, of a dowel pin having a head piece set at an angle thereto, said head piece being arranged to fit and to slide in said longitudinal groove in the beading and having a slot adapted to be widened to cause said head to be held tightly at any suitable place within said groove.

2. In combination with an angle iron, undercut on its two inner sides to form a groove, a dowel pin having a head thereon bent substantially at right angles thereto, said head being provided with an elongated slot adapted to be widened to cause said head to jam tightly within said undercut groove, substantially as described.

In witness whereof I have hereunto set my hand in the presence of two witnesses.

HERMANN ZEGLIN.

Witnesses:
 HENRY HASPER,
 WOLDEMAR HAUPT.